(12) United States Patent
Rojas et al.

(10) Patent No.: US 8,593,831 B2
(45) Date of Patent: Nov. 26, 2013

(54) METHOD FOR CONTROLLING A SERIES RESONANT DC/DC CONVERTER

(75) Inventors: Roberto Rojas, Stockholm (SE); Nils Backman, Stockholm (SE)

(73) Assignee: Eltek Valere AS, Drammen (NO)

( * ) Notice: Subject to any disclaimer, the term of this patent is extended or adjusted under 35 U.S.C. 154(b) by 0 days.

(21) Appl. No.: 13/821,571

(22) PCT Filed: Oct. 25, 2011

(86) PCT No.: PCT/EP2011/068643
§ 371 (c)(1),
(2), (4) Date: Apr. 9, 2013

(87) PCT Pub. No.: WO2012/055862
PCT Pub. Date: May 3, 2012

(65) Prior Publication Data
US 2013/0208512 A1   Aug. 15, 2013

(30) Foreign Application Priority Data
Oct. 28, 2010   (GB) .................................. 1018262.4

(51) Int. Cl.
*H02M 3/335*   (2006.01)

(52) U.S. Cl.
USPC ........................................................ 363/21.02

(58) Field of Classification Search
USPC ........... 363/15, 16, 17, 21.02, 56.02, 98, 131, 363/132
See application file for complete search history.

(56) References Cited

U.S. PATENT DOCUMENTS 4,953,068 A * 8/1990 Henze ............................. 363/17

(Continued)

OTHER PUBLICATIONS

Xiaodong, Li et al, "Analysis and design of High-Frequency Isolated Dual-Bridge Series Resonant DC/DC Converter", IEEE Transactions on Power Electronics, IEEE Service Center, Piscataway, NJ, US, vol. 24, No. 4, Apr. 1, 2010 pp. 850-862.

Krismer F et al, "A comparative evaluation of isolated bi-directional DC/DC converters with wide input and output voltage range", Conference Record of the 2005 IEEE Industry Applications Conference Fortieth IAS Annual Meeting Oct. 2-6, 2005, Kowloon, Hong Kong, China, IEEE Cat. No. 05, vol. 1, Oct. 2, 2005, pp. 599-606.

*Primary Examiner* — Nguyen Tran

(74) *Attorney, Agent, or Firm* — Christian D. Abel

(57) ABSTRACT

The invention relates to a method for controlling a series resonant DC/DC converter. The method comprises the steps of: defining a switching period TP having a first half period TA and a second half period TB and defining a subsequent switching period TP+1 after the switching period TP. In a next step, a first set (S1$sc$1; S1$sc$1, S4$sc$1) of switches of a first switching circuit (SC1) is controlled to be ON from the beginning Tstart of the first half period TA minus a time interval ΔTAE1, where the time interval ΔTAE1 is provided at the end of the first half period TA and a second set (S2$sc$1; S2$sc$1, S3$sc$1) of switches of the first switching circuit (SC1) is controlled to be ON from the beginning Tcenter of the second half period TB minus a time interval ΔTBE1, where the time interval ΔTBE1 is provided at the end of the second half period TB. A first set (S1$sc$2; S1$sc$2, S4$sc$2) of switches of a second switching circuit (SC2) is controlled to be ON in the first half period TA minus a time interval ΔTAS1 and minus a time interval ΔTAE2, where the time interval ΔTAS1 is provided at the beginning of the first half period TA and where the time interval ΔTAE2 is provided at the end of the first half period TA and a second set (S2$sc$2; S2$sc$2, S3$sc$2) of switches of the second switching circuit (SC2) is controlled to be ON in the second half period TB minus time interval ΔTBS1 and minus time interval ΔTBE2, where the time interval ΔTBS1 is provided at the beginning of the second half period TB and where the time interval ΔTBE2 is provided in the end of the second half period TB. Time intervals Tsc1off1 and Tsc2off1, and time intervals Tsc1off2 and Tsc2off2, where the sets of the first and second switching circuits all are off, are at least partially overlapping.

8 Claims, 13 Drawing Sheets

(56) References Cited

U.S. PATENT DOCUMENTS

| | | |
|---|---|---|
| 6,370,050 B1 | 4/2002 | Peng |
| 7,177,163 B2 * | 2/2007 | Eguchi et al. .................. 363/17 |
| 7,848,118 B2 * | 12/2010 | Shimada et al. ................ 363/17 |
| 2004/0179381 A1 | 9/2004 | Eguchi |
| 2008/0074905 A1 | 3/2008 | Moiseev |
| 2009/0059622 A1 | 3/2009 | Shimada |

\* cited by examiner

Fig. 1: Typical application for bi-directional DC/DC converters

METHOD FOR CONTROLLING A SERIES RESONANT DC/DC CONVERTER

FIELD OF THE INVENTION

The present invention relates to method for controlling a series resonant DC/DC converter and a series resonant DC/DC converter controlled according to the method.

BACKGROUND OF THE INVENTION

A typical uninterruptable power supply (UPS) system is shown in FIG. 1. The UPS system comprises an input converter for converting electric power from an AC or DC power source. A typical UPS has an input power stage that converts the commercial AC mains or a renewable energy AC or DC source, to a DC voltage. The DC voltage is then converted by means of a converter to a controlled AC or DC voltage thus forming a power supply to electrical loads such as computers, refrigerators etc that need uninterrupted power supply. Typically, a regulated DC bus is provided between the input converter and the output converter. The DC bus is ideally suited to be connected to a DC battery. A bidirectional DC/DC converter is needed if the battery voltage differs from the DC voltage on the DC-bus.

A typical AC-UPS can handle a power failure in the AC mains, by using a battery to supply DC power to the DC bus via a DC/DC converter, so the power supplied to the AC load is not interrupted. When the AC mains is operable again, power from the AC mains can be used to recharge the battery and supply energy to the load.

In many UPS systems, one DC/DC converter is used for supplying power from the battery to the DC bus and a separate converter is used to charge the battery. The battery charging converter can either be an AC/DC converter supplied with power from the AC mains, or a separate DC/DC converter supplied with power from the DC bus.

In some applications, the input may also be a DC source, for example a renewable electrical energy source such as solar cells.

There exist many proposed circuits for one-directional and bi-directional DC/DC converters for improved efficiency such as in "*Performance optimization of a High Current Dual Active Bridge with Wide operating Voltage Range*", by Krismer, Round, Kolar" published in Power Electronics Specialists Conference, 2006, "*A new HE ZVZCS Bidirectional DC/DC converter for HEV 42V Power Systems*", by Kim, Han, Park, Moon published in Journal of Power Electronics, Vol. 6, No. 3, July 2006, "*Bidirectional DC/DC Power Conversion using Quasi-Resonant Topology*", by Ray, published in Power Electronics Specialists Conference, 1992, "*A Bidirectional DC_DC converter for renewable energy systems*", by Jalbrzykowski, Citko, published in Bulletin of the Polish Academy of Technical Sciences Vol. 57, No. 4, 2009. All of these are operated at fixed frequency and controlled by either phase-shifting gate pulses or duty cycle modulation. All of these circuits have the drawback of limited operating ranges for high efficiency operation, such as zero voltage switching (ZVS) of main switches for only a limited load range etc.

The object of the present invention is to provide a method for controlling a series resonant DC/DC converter with improved efficiency. The object is also to provide a method for controlling a series resonant DC/DC converter so that a bidirectional DC/DC converter is achieved. Hence, the series resonant DC/DC converter can be used both for supplying power from the battery to the DC bus during power failures and for supplying power from the DC bus to recharge the battery after a power failure. This reduces the number of components, and hence costs/space can be saved.

SUMMARY OF THE INVENTION

The present invention relates to a method for controlling a series resonant DC/DC converter, comprising the steps of:
defining a switching period TP from time Tstart to time Tend for the series resonant DC/DC converter; where the switching period TP comprises a first half period TA from time Tstart to time Tcenter and a second half period TB from time Tcenter to time Tend, and defining a subsequent switching period TP+1 after the switching period TP;
controlling a first set of switches of a first switching circuit to be ON from the beginning Tstart of the first half period TA minus a time interval $\Delta$TAE1, where the time interval $\Delta$TAE1 is provided at the end of the first half period TA;
controlling a second set of switches of the first switching circuit to be ON from the beginning Tcenter of the second half period TB minus a time interval $\Delta$TBE1, where the time interval $\Delta$TBE1 is provided at the end of the second half period TB;
controlling the first set and the second set of switches of the first switching circuit to be OFF in the time interval $\Delta$TAE1 and the time interval $\Delta$TBE1;
controlling a first set of switches of a second switching circuit to be ON in the first half period TA minus a time interval $\Delta$TAS1 and minus a time interval $\Delta$TAE2, where the time interval $\Delta$TAS 1 is provided at the beginning of the first half period TA and where the time interval $\Delta$TAE2 is provided at the end of the first half period TA;
controlling a second set of switches of the second switching circuit to be ON in the second half period TB minus time interval $\Delta$TBS1 and minus time interval $\Delta$TBE2, where the time interval $\Delta$TBS1 is provided at the beginning of the second half period TB and where the time interval $\Delta$TBE2 is provided in the end of the second half period TB;
controlling the first set and the second set of switches of the second switching circuit to be OFF in the time intervals $\Delta$TAS1, $\Delta$TAE2, $\Delta$TBS1 and $\Delta$TBE2;
where the time interval $\Delta$TAE1 forms a first time interval Tsc1off1 wherein the first and second sets of switches of the first switching circuit are OFF, and where the time interval $\Delta$TBE forms a second time interval Tsc1off2 wherein the first and second sets of switches of the first switching circuit are OFF;
where the time intervals $\Delta$TAE2 and $\Delta$TBS1 form a continuous time interval Tsc2off1, where the first and second set of switches of the second switching circuit are OFF; and where the time interval $\Delta$TBE2 and a time interval $\Delta$TAS1 (TP+1) of the subsequent switching period TP+1 form a continuous time interval Tsc2off2, where the first and second sets of switches of the second switching circuit are OFF;
where the time interval Tsc1off1 and the time interval Tsc2off1 is overlapping and where the time interval Tsc1off2 and the time interval Tsc2off2 is overlapping.

In one aspect the method comprises the step of controlling the centre of interval Tsc1off1 to be close to or equal to the centre of time interval Tsc2off1 and the centre of interval Tsc1off2 to be close to or equal to the centre of time interval Tsc2off2.

In one aspect the method comprises the step of controlling the relation between the voltage between first DC terminals of the series resonant DC/DC converter and the voltage between second DC terminals of the series resonant DC/DC converter by varying the length of the switching period TP.

In one aspect the method comprises the step of controlling the direction of the power flow through the series resonant DC/DC converter by varying the switching period TP.

In one aspect the method comprises the step of controlling the switches of the first and second switching circuit to provide zero voltage switching at switch turn on and to provide nearly zero current switching at switch turn off by controlling the first and second switching circuit to have a fixed switching frequency close to the series resonant frequency.

In one aspect the switches of the first and second switching circuit are controlled by switching at an operating point at or near the series resonant frequency for all voltages over the first DC terminals which are inside a specified operating range.

In one aspect the switches of the first and second switching circuit are controlled by switching at an operating point at or near the series resonant frequency for all load conditions at the second DC terminals.

The present invention also relates to a series resonant DC/DC converter comprising:
first DC terminals;
second DC terminals;
an inductor device;
a first switching circuit connected between the first DC terminals and the inductor device, where the first switching circuit comprises a first set of switches and a second set of switches;
a second switching circuit and a resonant circuit connected between the second DC terminals and the inductor device, where the second switching circuit comprises a first set of switches and a second set of switches;
a control circuit for controlling the set of switches of the first and second switching circuits according to one of the methods above.

DETAILED DESCRIPTION

Embodiments of the present invention will be described in detail in the following with reference to the enclosed drawings, where:

Figure 1:
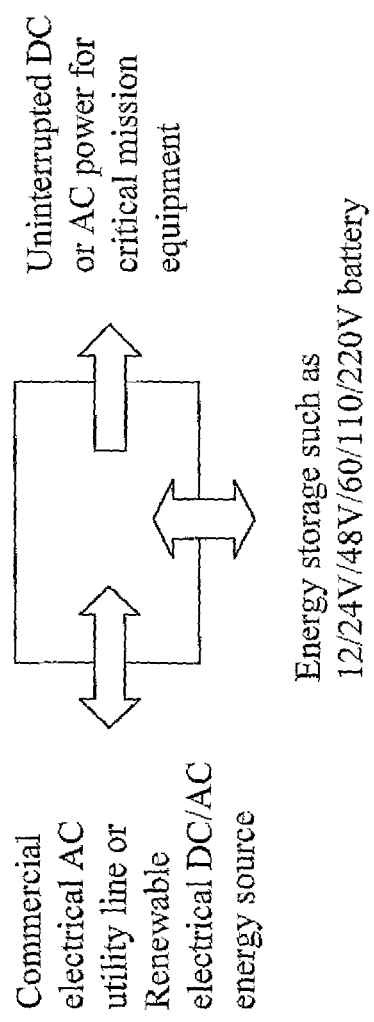
FIG. 1 illustrates a a typical application for bidirectional DC/DC converters.

It is now referred to FIG. 2-7, illustrating embodiments of the series resonant DC/DC converter. It should be noted that by the term "series resonant DC/DC converter series" it is meant different types of series resonant LC DC/DC converters and different types of series resonant LLC DC/DC converters. The series resonant DC/DC converter may also be a bidirectional DC/DC converter.

The DC/DC converter comprises first DC terminals T1P, T1N and second DC terminals T2P, T2N. The first DC terminals comprise a first positive DC terminal T1P and a first negative DC terminal T1N. The second DC terminals comprise a second positive DC terminal T2P and a second negative DC terminal T2N.

The DC/DC converter further comprises an inductor device, either in the form of a single inductor device ID (as in the embodiment of FIG. 7) or in the form of a transformer device TD (as in the embodiments of FIGS. 2-6).

The single inductor device ID may comprise a single inductor Lm, or may comprise several inductors, but does not provide a galvanic isolation.

The transformer device TD may comprise a first winding and a second winding. The transformer device provides galvanic isolation between the first DC terminals and the second DC terminals. The transformer also comprises a magnetizing inductance, which forms a parallel resonance circuit together with the resonant capacitor(s).

The transformer ratio of the transformer device is 1:1 in the present embodiments; however, other transformer ratios are also possible and can be designed in order to meet requirements for input output voltage and current ratios.

A first switching circuit SC1 (illustrated by a dashed box) is connected between the first DC terminals T1P, T1N and the inductor device (either the single inductor device ID or the transformer device TD). The first switching circuit SC1 comprises a first set of switches and a second set of switches. The first set and the second set of switches may each comprise one, two or several switches.

The first switching circuit SC1 is arranged to be controlled in three different switching states. The first state allows a current to flow through the inductor device from the first positive DC terminal T1P to the negative DC terminal T1N by commanding the first set of switches to be ON. The second state allows a current to flow through the inductor device from the first negative DC terminal T1N to the first positive DC terminal T1P by commanding the second set of switches to be ON. The third switching state is characterized by commanding both sets of switches to be OFF A second switching circuit SC2 (illustrated by a dashed box) and a resonant circuit RC (illustrated by a dashed box) are connected between the second DC terminals T2P, T2N and the inductor device (either the single inductor device ID or the transformer device TD). The second switching circuit SC2 comprises a first set of switches and a second set of switches. The first set and the second set of switches may each comprise one, two or several switches. It can be seen that the second switching circuit SC2 and a resonant circuit RC are connected in series with the inductor device (the single inductor device ID or the transformer device TD) between the second DC-terminals T2P and T2N. The series combination of the resonant circuit RC and the inductor device is connected to the second switching circuit SC2. The second switching circuit, SC2, is arranged to be controlled in three different switching states. The first state allows a resonant current to flow through the series combination of the resonant circuit RC and the inductor device from the second positive DC terminal T2P to the second negative DC terminal T2N by commanding the first set of switches to be ON. The second state allows a resonant current to flow through the series combination of RC and the inductor device from the second negative DC terminal T2N to the second positive DC terminal T2P by commanding the second set of switches to be ON. The third switching state is characterized by commanding both sets of switches to be OFF.

The first switching circuit SC1 may be a push pull circuit or a bridge circuit, such as a full bridge circuit or a half bridge circuit.

The second switching circuit SC2 may also be a bridge circuit, such as a full bridge circuit or a half bridge circuit.

The resonant circuit RC is often referred to as a resonant tank and comprises at least one capacitor or at least one inductor in a suitable configuration together with the inductor device, either the single inductor device ID or the second winding of the transformer device T, where the inductance of the at least one capacitor and/or at least one inductor together with the inductance of the single inductor device ID or the second winding of the transformer device T defines a resonance frequency so that the DC/DC converter exhibits zero voltage turn on switching on all active switches of SC1 and SC2.

The resonant circuit RC may also be a multi-element resonant circuit comprising several capacitors and inductors in a LC network. Hence, the converter can be considered as a series resonant LLC DC/DC converter.

In addition, the DC/DC converter comprises a control circuit which can determine the desired direction of power flow and control the direction of current at the first and second DC-terminals and thus make the converter supply energy either to the load connected to the first DC-terminals or the load connected to the second DC-terminals.

In the following, several embodiments will be described. In all these embodiments, the switches are MOSFET switches. Alternatively, the switches may be switches with intrinsic diodes or switches connected in parallel with anti-parallel diodes, such as IGBTs with anti-parallel diodes.

First Embodiment

Figure 2:
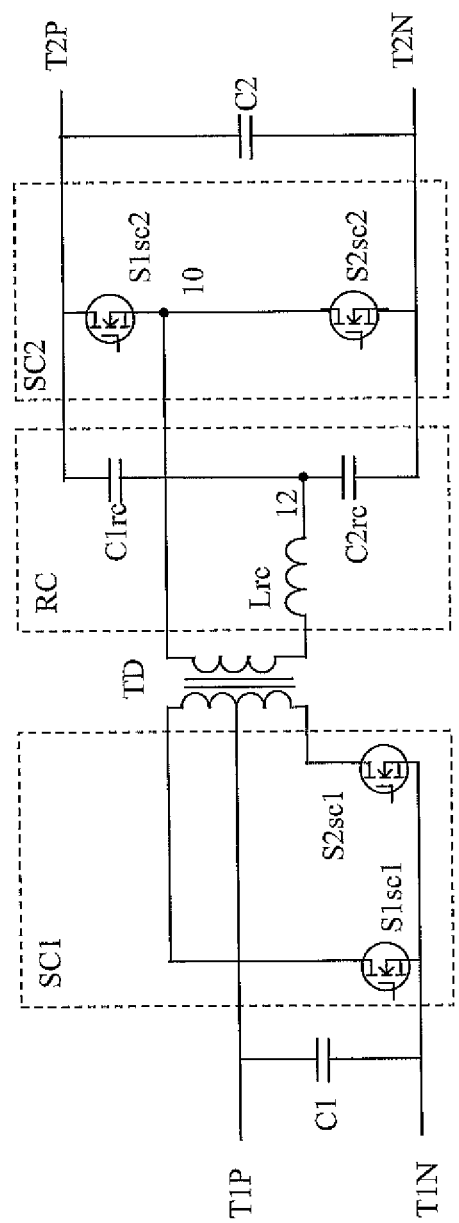
FIG. 2 illustrates a first embodiment of the DC/DC converter.

It is now referred to FIG. 2. Here the first switching circuit SC1 is a half bridge circuit comprising a first switch S1$sc1$ and a second switch S2$sc1$. The first set of switches of the first switching circuit SC1 here comprises the first switch S1$sc1$ and the second set of switches of the first switching circuit SC1 comprises the second switch S2$sc1$.

The first switch S1$sc1$ is connected between the first negative DC terminal T1N and a first terminal of the first winding. The source of the switch is connected to the first negative DC terminal T1N.

The second switch S2$sc1$ is connected between the first negative DC terminal T1N and a second terminal of the first winding. The source of the switch is connected to the first negative DC terminal T1N.

The first winding of the transformer device T comprises a third terminal connected to the first positive DC terminal T1P. The third terminal of the second winding is provided between the first terminal and the second terminal of the second winding. Hence, the number of turns between the first and third terminals and the number of turns between the second and third terminals is equal to the total number of turns for the second winding. In the present embodiment, the number of turns between the first and third terminals and the number of turns between the second and third terminals is equal to each other.

A first capacitor C1 is connected between the first positive DC terminal T1P and the first negative DC terminal T1N.

The second switching circuit SC2 is a half bridge circuit comprising a first switch S1$sc2$ and a second switch S2$sc2$.

The first set of switches of the second switching circuit SC2 here comprises the first switch S1$sc2$ and the second set of switches of the second switching circuit SC2 comprises the second switch S2$sc2$ The first switch S1$sc2$ is connected between a first node 10 and the second positive DC terminal T2P. The second switch S2$sc2$ is connected between the second negative DC terminal T2N and the second node 10. The source of the first switch S1$sc2$ is connected to the second negative DC terminal T2N and the source of the second switch S2$sc2$ is connected to the first node 10. The first node 10 is also connected to a first terminal of the second winding of the transformer device T.

The resonant circuit RC comprises a resonant inductor Lrc, a first resonant capacitor C1$rc$ and a second resonant capacitor C2$rc$. The resonant inductor Lrc is connected between a second terminal of the second winding of the transformer T and a second node 12. The first resonant capacitor C1rc is connected between the second node 12 and the second positive DC terminal T2P. The second resonant capacitor C2$rc$ is connected between the second node 12 and the second negative DC terminal T2N.

Second Embodiment

Figure 3:
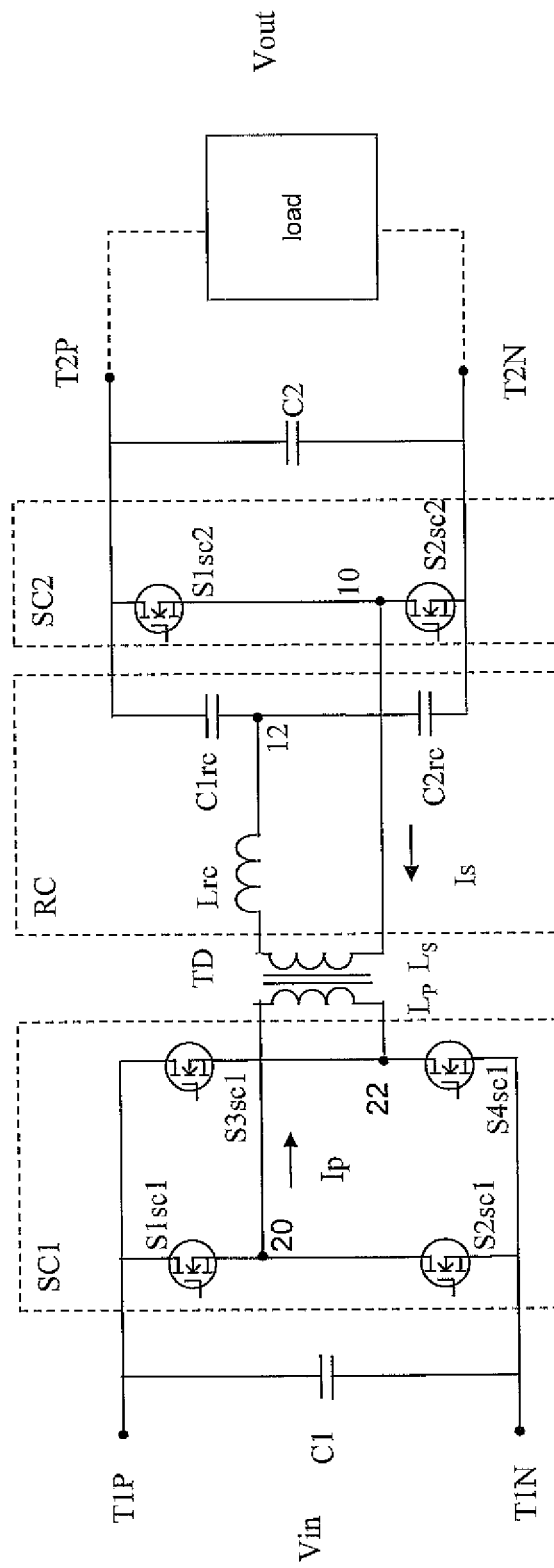
FIG. 3 illustrates a second embodiment of the DC/DC converter.

It is now referred to FIG. 3.

The first switching circuit SC1 is a full bridge circuit comprising a first switch S1$sc1$, a second switch S2$sc1$, a third switch S3$sc1$ and a fourth switch S4$sc1$.

The first set of switches of the first switching circuit SC1 here comprises the first switch S1$sc1$ and the fourth switch S4$sc1$. The second set of switches of the first switching circuit SC1 comprises the second switch S2$sc1$ and the third switch S3$sc1$.

The first switch S1$sc1$ is connected between the first positive DC terminal T1P and a first node 20. The source of the switch is connected to the first node 20.

The second switch S2$sc1$ is connected between the first negative DC terminal T1N and the first node 20. The source of the switch is connected to the first negative DC terminal T1N.

The third witch S3$sc1$ is connected between the first positive DC terminal T1P and a second node 22. The source of the switch is connected to the second node 22.

The fourth switch S4$sc1$ is connected between the first negative DC terminal T1N and the second node 22. The source of the switch is connected to the first negative DC terminal T1N.

The first node 20 is connected to the first terminal of the first winding of the transformer device T. The second node 22 is connected to the second terminal of the first winding of the transformer device T.

A first capacitor C1 is connected between the first positive DC terminal T1P and the first negative DC terminal T1N.

The second switching circuit SC2 is here a half bridge circuit comprising a first switch S1$sc2$ and a second switch S2$sc2$.

The first set of switches of the second switching circuit SC2 here comprises the first switch S1$sc2$ and the second set of switches of the second switching circuit SC2 comprises the second switch S2$sc2$. The first switch S1$sc2$ is connected between a first node 10 and the second positive DC terminal T2P. The second switch S2$sc2$ is connected between the second negative DC terminal T2N and the second node 10. The source of the first switch S1$sc2$ is connected to the node 10 and the source of the second switch S2$sc2$ is connected to the second negative DC terminal T2N. The first node 10 is also connected to a first terminal of the second winding of the transformer device T.

The resonant circuit RC comprises a resonant inductor Lrc, a first resonant capacitor C1$rc$ and a second resonant capacitor C2rc. The resonant inductor Lrc is connected between a second terminal of the second winding of the transformer T and a second node 12. The first resonant capacitor C1rc is connected between the second node 12 and the second positive DC terminal T2P. The second resonant capacitor C2rc is connected between the second node 12 and the second negative DC terminal T2N.

A second capacitor C2 is connected between the second positive DC terminal T2P and the second negative DC terminal T2N.

In FIG. 3, the first winding of the transformer device TD is denoted as Tp, the second winding of the transformer device TD is denoted as Ts. The current through the first winding is denoted as Ip, the current through the second winding is denoted as Is.

As shown in FIG. 3, a voltage source with input voltage Vin is connected between the first negative DC terminal and the first positive DC terminal T1P, T1N. A load Rload is connected between the second negative DC terminal and the second positive DC terminal T2P, T2N.

Third Embodiment

Figure 4:
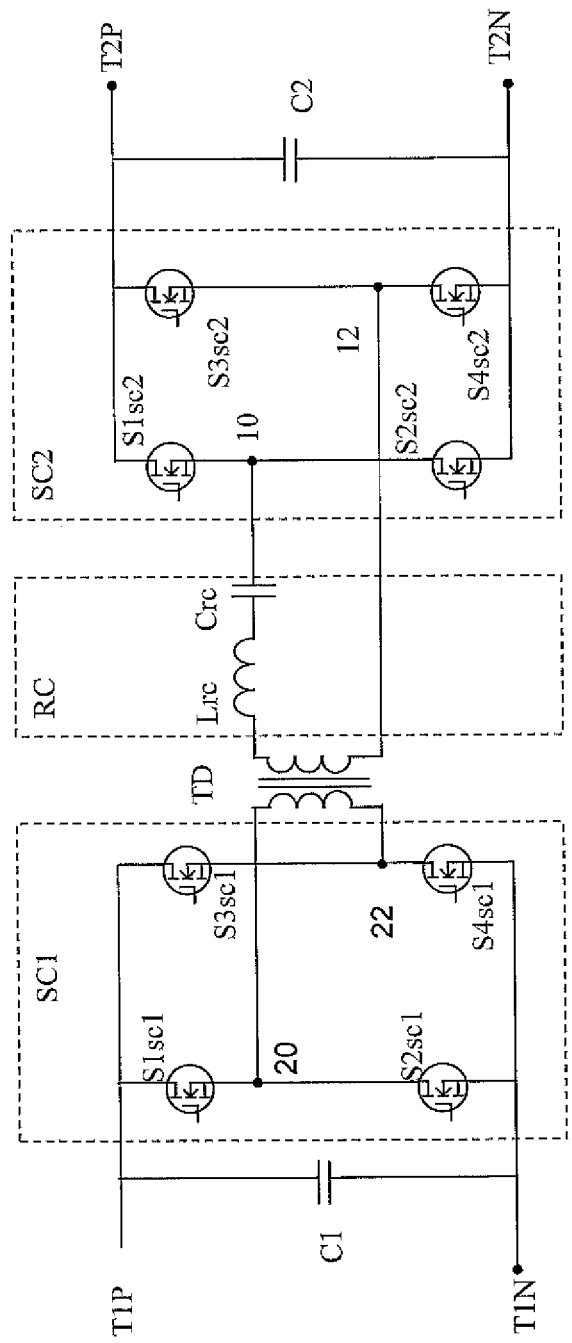
FIG. 4 illustrates a third embodiment of the DC/DC converter.

It is now referred to FIG. 4.

The first switching circuit SC1 is a full bridge circuit comprising a first switch S1$sc$1, a second switch S2$sc$1, a third switch S3$sc$1 and a fourth switch S4$sc$1.

The first set of switches of the first switching circuit SC1 here comprises the first switch S1$sc$1 and the fourth switch S4$sc$1. The second set of switches of the first switching circuit SC1 comprises the second switch S2$sc$1 and the third switch S3$sc$1. The first switch S1$sc$1 is connected between the first positive DC terminal T1P and a first node 20. The source of the switch is connected to the first node 20.

The second switch S2$sc$1 is connected between the first negative DC terminal T1N and the first node 20. The source of the switch is connected to the first negative DC terminal T1N.

The third witch S3$sc$1 is connected between the first positive DC terminal T1P and a second node 22. The source of the switch is connected to the second node 22.

The fourth switch S4$sc$1 is connected between the first negative DC terminal T1N and the second node 22. The source of the switch is connected to the first negative DC terminal T1N.

The first node 20 is connected to the first terminal of the first winding of the transformer device T. The second node 22 is connected to the second terminal of the first winding of the transformer device T.

A first capacitor C1 is connected between the first positive DC terminal T1P and the first negative DC terminal T1N.

The second switching circuit SC2 is a full bridge circuit comprising a first switch S1$sc$2, a second switch S2$sc$2, a third switch S3$sc$2 and a fourth switch S4$sc$2.

The first set of switches of the second switching circuit SC2 here comprises the first switch S1$sc$2 and the fourth switch S4$sc$2. The second set of switches of the second switching circuit SC2 comprises the second switch S2$sc$2 and the third switch S3$sc$2.

The first switch S1$sc$2 is connected between the second positive DC terminal T2P and a first node 10. The source of the first switch S1$sc$2 is connected to the first node 10.

The second switch S2$sc$2 is connected between the second negative DC terminal T1N and the first node 10. The source of the switch is connected to the second negative DC terminal T2N.

The third switch S3$sc$2 is connected between the second positive DC terminal T2P and a second node 12. The source of the switch is connected to the second node 12.

The fourth switch S4$sc$2 is connected between the second negative DC terminal T2N and the second node 12. The source of the switch is connected to the second negative DC terminal T2N.

The second node 12 of the second switching circuit SC2 is also connected to a first terminal of the second winding of the transformer device T.

The resonant circuit RC comprises a resonant inductor Lrc and a resonant capacitor Crc connected in series between a second terminal of the second winding of the transformer device T and the first node 10.

A second capacitor C2 is connected between the second positive DC terminal T2P and the second negative DC terminal T2N.

Fourth Embodiment

Figure 5:
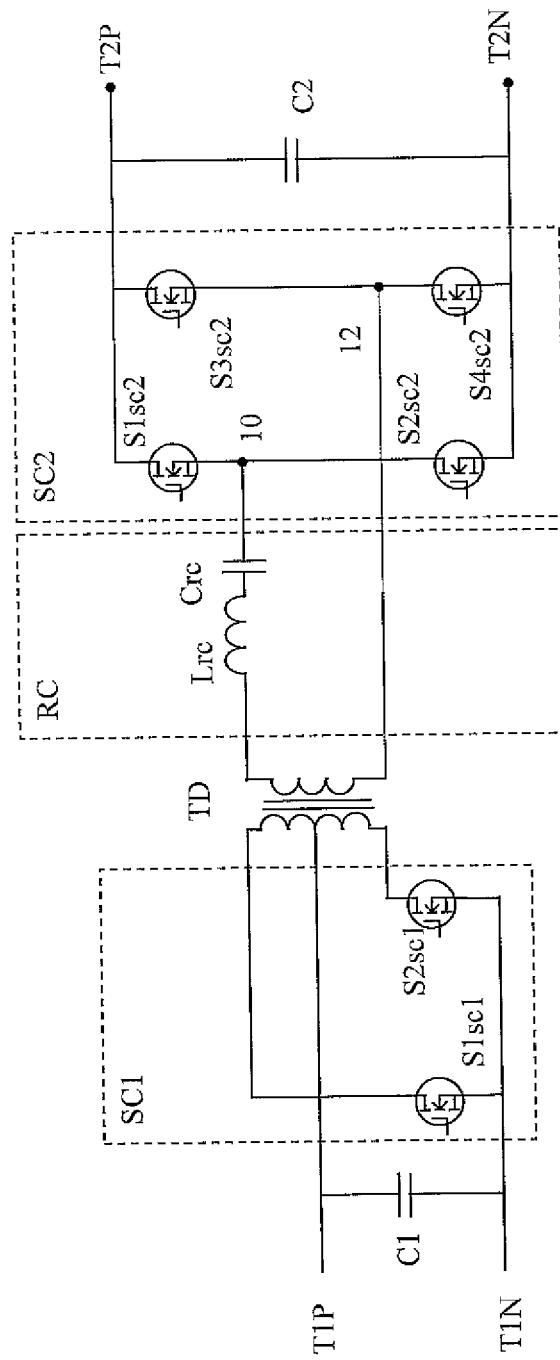
FIG. 5 illustrates a fourth embodiment of the DC/DC converter.

It is now referred to FIG. 5.

Here, the first switching circuit SC1 is a half bridge circuit comprising a first switch S1$sc$1 and a second switch S2$sc$1. The first set of switches of the first switching circuit SC1 here comprises the first switch S1$sc$1 and the second set of switches of the first switching circuit SC1 comprises the second switch S2$sc$1. The first switch S1$sc$1 is connected between the first negative DC terminal T1N and a first terminal of the first winding. The source of the switch is connected to the first negative DC terminal T1N.

The second switch S2$sc$1 is connected between the first negative DC terminal T1N and a second terminal of the first winding. The source of the switch is connected to the first negative DC terminal T1N.

The first winding of the transformer device T comprises a third terminal connected to the first positive DC terminal T1P. The third terminal of the second winding is provided between the first terminal and the second terminal of the second winding. Hence, the number of turns between the first and third terminals and the number of turns between the second and third terminals is equal to the total number of turns for the second winding. In the present embodiment, the number of turns between the first and third terminals and the number of turns between the second and third terminals is equal to each other.

A first capacitor C1 is connected between the first positive DC terminal T1P and the first negative DC terminal T1N.

The second switching circuit SC2 is a full bridge circuit comprising a first switch S1$sc$2, a second switch S2$sc$2, a third switch S3$sc$2 and a fourth switch S4$sc$2.

The first set of switches of the second switching circuit SC2 here comprises the first switch S1$sc$2 and the fourth switch S4$sc$2. The second set of switches of the second switching circuit SC2 comprises the second switch S2$sc$2 and the third switch S3$sc$2.

The first switch S1$sc$2 is connected between the second positive DC terminal T2P and a first node 10. The source of the first switch S1$sc$2 is connected to the first node 10.

The second switch S2$sc$2 is connected between the second negative DC terminal T1N and the first node 10. The source of the switch is connected to the second negative DC terminal T2N.

The third switch S3$sc$2 is connected between the second positive DC terminal T2P and a second node 12. The source of the switch is connected to the second node 12.

The fourth switch S4$sc$2 is connected between the second negative DC terminal T2N and the second node 12. The source of the switch is connected to the second negative DC terminal T2N.

The second node 12 of the second switching circuit SC2 is also connected to a first terminal of the second winding of the transformer device T.

The resonant circuit RC comprises a resonant inductor Lrc and a resonant capacitor Crc connected in series between a second terminal of the second winding of the transformer device T and the first node 10.

A second capacitor C2 is connected between the second positive DC terminal T2P and the second negative DC terminal T2N.

Fifth Embodiment

Figure 6:
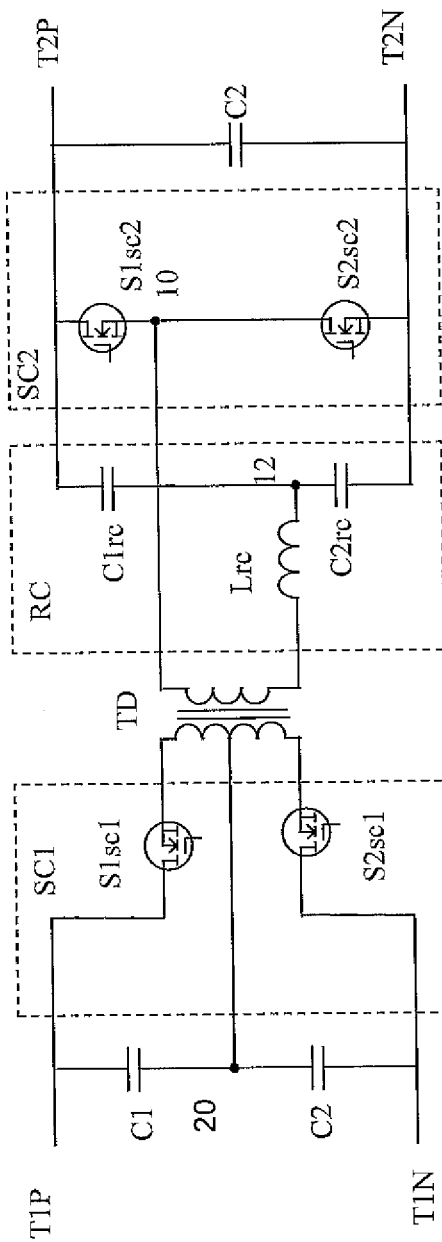
FIG. 6 illustrates a fifth embodiment of the DC/DC converter.

It is now referred to FIG. 6.

Here, the first switching circuit SC1 is a voltage doubler circuit comprising a first switch S1sc1 and a second switch S2sc1. The first set of switches of the first switching circuit SC1 here comprises the first switch S1sc1 and the second set of switches of the first switching circuit SC1 comprises the second switch S2sc1.

The first switch S1sc1 is connected between the first positive DC terminal T1P and a first terminal of the first winding of the transformer device TD. The source of the switch is connected to the first terminal of the first winding of the transformer device TD.

The second switch S2sc1 is connected between the first negative DC terminal T1N and a second terminal of the first winding of the transformer device TD. The source of the switch is connected to the second terminal of the first winding of the transformer device TD.

A first capacitor C1 is connected between the first positive DC terminal T1P and a node 20. A second capacitor C2 is connected between the node 20 and the first negative DC terminal T1N. The node 20 is connected to a third terminal of the first winding of the transformer device TD.

The third terminal of the second winding is provided between the first terminal and the second terminal of the second winding. Hence, the number of turns between the first and third terminals and the number of turns between the second and third terminals is equal to the total number of turns for the second winding. In the present embodiment, the number of turns between the first and third terminals and the number of turns between the second and third terminals is equal to each other.

The second switching circuit SC2 is here a half bridge circuit comprising a first switch S1sc2 and a second switch S2sc2.

The first set of switches of the second switching circuit SC2 here comprises the first switch S1sc2 and the second set of switches of the second switching circuit SC2 comprises the second switch S2sc2.

The first switch S1sc2 is connected between a first node 10 and the second positive DC terminal T2P. The second switch S2sc2 is connected between the second negative DC terminal T2N and the second node 10.

The source of the first switch S1sc2 is connected to the node 10. The source of the second switch S2sc2 is connected to the second negative DC terminal T2N. The first node 10 is also connected to a first terminal of the second winding of the transformer device T.

The resonant circuit RC comprises a resonant inductor Lrc, a first resonant capacitor C1rc and a second resonant capacitor C2rc. The resonant inductor Lrc is connected between a second terminal of the second winding of the transformer T and a second node 12. The first resonant capacitor C1rc is connected between the second node 12 and the second positive DC terminal T2P. The second resonant capacitor C2rc is connected between the second node 12 and the second negative DC terminal T2N.

Sixth Embodiment

Figure 7:
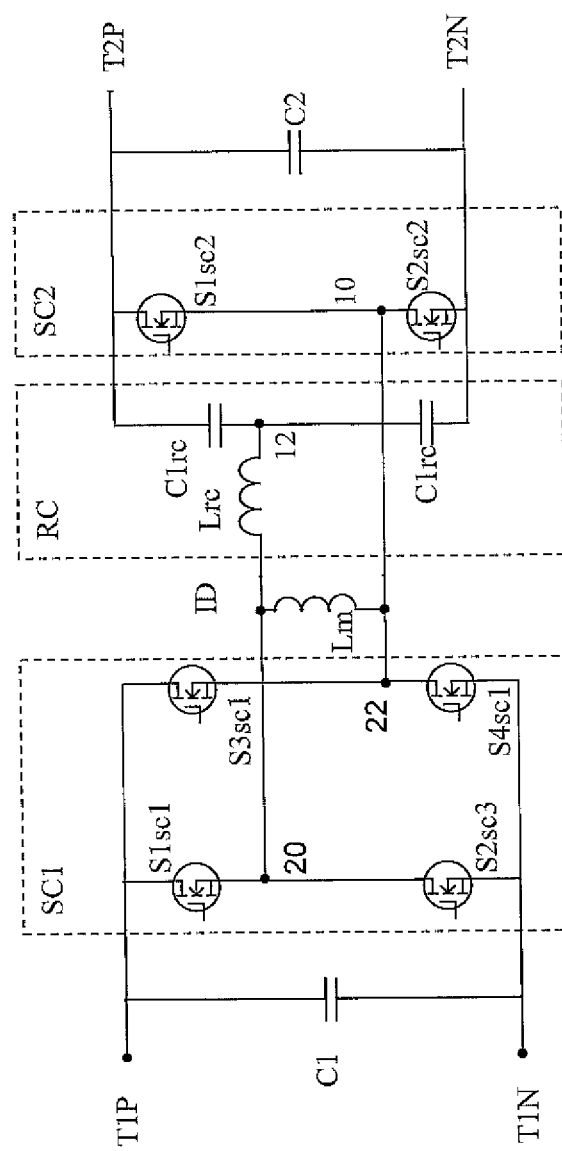
FIG. 7 illustrates a fifth embodiment of the DC/DC converter; this embodiment does not have a transformer device.

It is now referred to FIG. 7.

The first switching circuit SC1 is a full bridge circuit comprising a first switch S1sc1, a second switch S2sc1, a third switch S3sc1 and a fourth switch S4sc1.

The first set of switches of the first switching circuit SC1 here comprises the first switch S1sc1 and the fourth switch S4sc1. The second set of switches of the first switching circuit SC1 comprises the second switch S2sc1 and the third switch S3sc1.

The first switch S1sc1 is connected between the first positive DC terminal T1P and a first node 20. The source of the switch is connected to the first node 20.

The second switch S2sc1 is connected between the first negative DC terminal T1N and the first node 20. The source of the switch is connected to the first negative DC terminal T1N.

The third switch S3sc1 is connected between the first positive DC terminal T1P and a second node 22. The source of the switch is connected to the second node 22.

The fourth switch S4sc1 is connected between the first negative DC terminal T1N and the second node 22. The source of the switch is connected to the first negative DC terminal T1N.

As mentioned above, there is no transformer device TD in the present embodiment. Instead, an inductor device ID in the form of a magnetizing inductor Lm is provided.

The first node 20 is connected to the first terminal of the magnetizing inductor Lm. The second node 22 is connected to the second terminal of the magnetizing inductor Lm.

A first capacitor C1 is connected between the first positive DC terminal T1P and the first negative DC terminal T1N.

The second switching circuit SC2 is here a half bridge circuit comprising a first switch S1sc2 and a second switch S2sc2.

The first set of switches of the second switching circuit SC2 here comprises the first switch S1sc2 and the second set of switches of the second switching circuit SC2 comprises the second switch S2sc2.

The first switch S1sc2 is connected between a first node 10 and the second positive DC terminal T2P. The second switch S2sc2 is connected between the second negative DC terminal T2N and the second node 10. The source of the first switch S1sc2 is connected to the node 10 and the source of the second switch S2sc2 is connected to the second negative DC terminal T2N. The first node 10 is also connected to the second terminal of the magnetizing inductor Lm.

The resonant circuit RC comprises a resonant inductor Lrc, a first resonant capacitor C1rc and a second resonant capacitor C2rc. The resonant inductor Lrc is connected between the first terminal of the magnetizing inductor Lm and a second node 12. The first resonant capacitor C1rc is connected between the second node 12 and the second positive DC terminal T2P. The second resonant capacitor C2rc is connected between the second node 12 and the second negative DC terminal T2N.

A second capacitor C2 is connected between the second positive DC terminal T2P and the second negative DC terminal T2N.

Control Circuit

A control circuit is provided for controlling the switches of the first and second switching circuits SC1 and SC2 to be ON and OFF. The control circuit may be implemented as a software program executed by a digital signal processor (DSP) or it may be implemented as an analogue circuit.

All switches are uni-polar, meaning that the switches can only block conduction in one direction. An example of a uni-polar switch is the MOSFET switch comprising an anti-parallel diode. Another example is the IGBT switch with an anti-parallel diode connected from emitter to drain.

The control method according to the invention will now be described in detail below with reference to FIGS. 8-12. Here, the control signals and resulting voltages and/or currents are shown for the embodiment shown in FIG. 3. The input voltage Vin was set to 50 VDC, and an output voltage was regulated to 350 VDC. The switching frequency is approximately 110 kHz.

Figure 8:
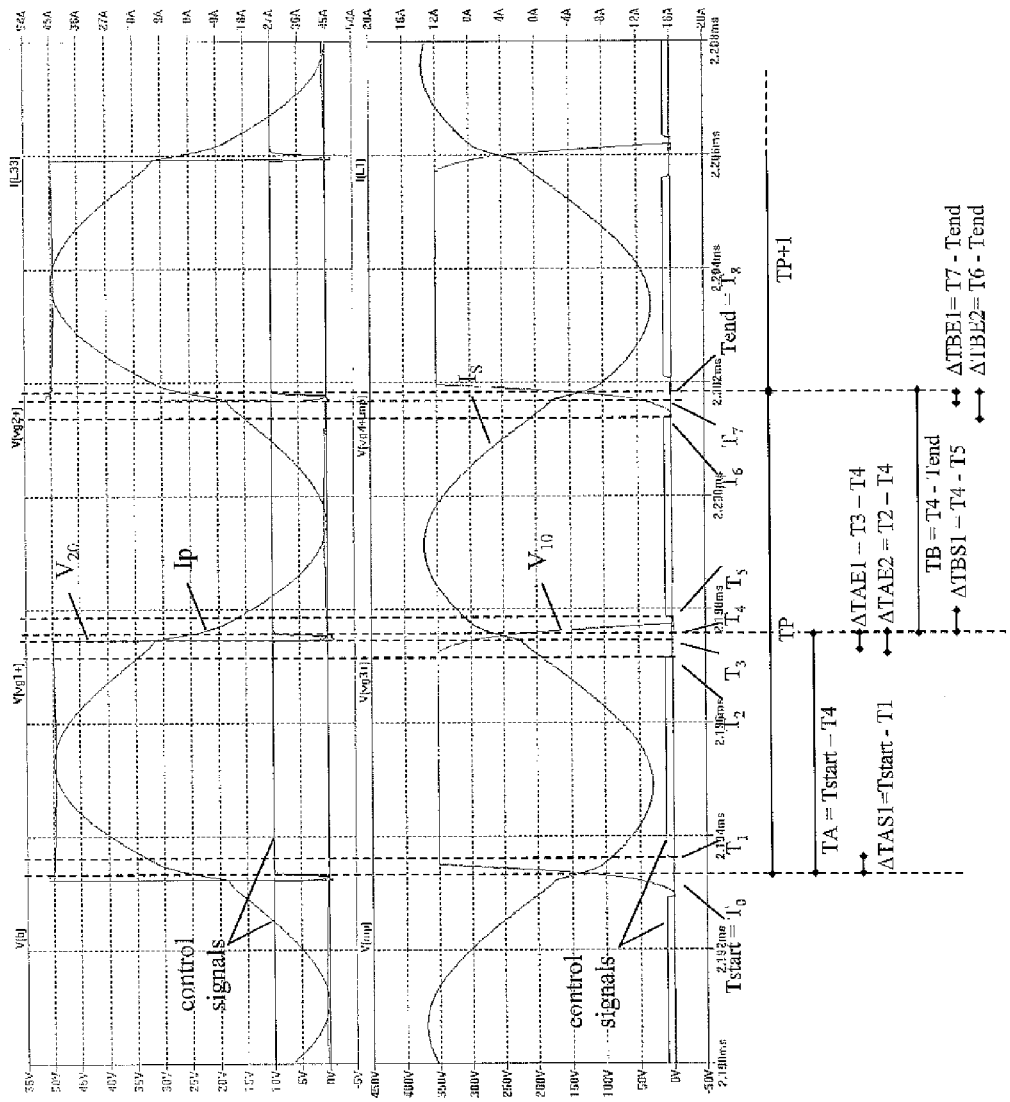
FIG. 8 shows waveforms of voltages and currents of the second embodiment at full load.

It is now referred to FIG. 8.

In a first step a switching period TP is defined from time Tstart to time Tend for the series resonant DC/DC converter. The switching period TP comprises a first half period TA from time Tstart to time Tcenter and a second half period TB from time Tcenter to time Tend. A next switching period after the switching period TP is denoted as a subsequent switching period TP+1.

As is described above, the series resonant DC/DC converter has a resonance frequency defined by the properties of the inductor device (ID or TD) and the elements (capacitors and inductors) of the resonance circuit RC.

The switching period TP, and hence the switching frequency, can be controlled by the control circuit to be be higher than, equal to, or lower than the resonance frequency. Hence, the switching period TP is not dependant of the resonance frequency.

In FIG. 8, relevant times T0 (equal to Tstart) to T8 (equal to Tend) for the first switching period TP are indicated by dashed lines, and several time intervals are also defined, as will be apparent from the description below. Time T8 (equal to Tend) is the start (i.e. time T0(TP+1)) of the subsequent switching period TP+1. Time T4 is here equal to Tcenter, but the length of the time intervals T0-T1, T1-T2, T2-T3, T3-T4, T4-T5, T5-T6, T6-T7, T7-T8 are not all equal to each other.

The duty cycle of all set of switches are essentially 50%, meaning that the switches have a control signal demanding the switch to be in a conducting state, ON, during nearly half of the switching period and having the control signal demanding the switch to be in a non-conducting state, OFF, during nearly half of the switching period. The set of switches are controlled independently to have different delays and yet synchronized.

The first set S1sc1; S1sc1, S4sc1 of switches of the first switching circuit SC1 is controlled to be ON from the beginning Tstart of the first half period TA minus a time interval ΔTAE1, where the time interval ΔTAE1 is provided at the end of the first half period TA. The first set S1sc1; S1sc1, S4sc1 of switches of the first switching circuit SC1 is controlled to be OFF in the second half period TB. The time interval ΔTAE1 in the present embodiment is starting at time T3 and is ending at time T4.

The second set S2sc1; S2sc1, S3sc1 of switches of the first switching circuit SC1 is controlled to be ON from the beginning Tcenter of the second half period TB minus a time interval ΔTBE1, where the time interval ΔTBE1 is provided at the end of the second half period TB. The second set S2sc1; S2sc1, S3sc1 of switches of the first switching circuit SC1 is controlled to be OFF in the first half period TA. The time interval ΔTBE1 is in the present embodiment starting at time T7 and is ending at time T8.

The first set S1sc1; S1sc1, S4sc1 and the second set S2sc1; S2sc1, S3sc1 of switches of the first switching circuit SC1 is controlled to be OFF in the time interval ΔTAE1 and the time interval ΔTBE1.

The time interval ΔTAE1 forms a first time interval Tsc1off1 wherein the first and second sets of switches of the first switching circuit SC1 are OFF. The time interval ΔTBE forms a second time interval Tsc1off2 wherein the first and second sets of switches of the first switching circuit SC1 are OFF.

The first set S1sc2; S1sc2, S4sc2 of switches of the second switching circuit SC2 is controlled to be ON in the first half period TA minus a time interval ΔTAS1 and minus a time interval ΔTAE2, where the time interval ΔTAS1 is provided at the beginning of the first half period TA and where the time interval ΔTAE2 is provided at the end of the first half period TA. The first set S1sc2; S1sc2, S4sc2 of switches of the second switching circuit SC is controlled to be OFF in the second half period TB. The time interval ΔTAS1 in the present embodiment is starting at time T0 and is ending at time T1. The time interval ΔTAE2 in the present embodiment is starting at time T2 and is ending at T4.

The second set S2sc2; S2sc2, S3sc2 of switches of the second switching circuit SC2 is controlled to be ON in the second half period TB minus time interval ΔTBS1 and minus time interval ΔTBE2, where the time interval ΔTBS1 is provided at the beginning of the second half period TB and where the time interval ΔTBE2 is provided in the end of the second half period TB. The second set S2sc2; S2sc2, S3sc2 of switches of the second switching circuit SC2 is controlled to be OFF in the first half period TA. The time interval ΔTBS1 in the present embodiment is starting at time T4 and is ending at time T5. The time interval ΔTBE2 in the present embodiment is starting at T6 and is ending at T8.

The first set S1sc2; S1sc2, S4sc2 and the second set S2sc2; S2sc2, S3sc2 of switches of the second switching circuit SC2 are controlled to be OFF in the time intervals ΔTAS1, ΔTAE2, ΔTBS1 and ΔTBE2.

The time intervals ΔTAE2 and ΔTBS1 form a continuous time interval Tsc2off1 from time T2 to time T5 where the first and second sets of switches of the second switching circuit SC2 are OFF. The time intervals ΔTBE2 and ΔTAS1(TP+1) (that is, the time interval ΔTAS1 of a subsequent switching period TP+1) form a continuous time interval Tsc2off2 from time T6 to time T1(TP+1) (that is, the time instance T1 of a subsequent switching period TP+1) where the first and second sets of switches of the second switching circuit SC2 are OFF.

Table 1 below shows the states for the first and second set of switches for the first switching circuit SC1 for the switching period TP. The start time and end time of each interval are also given.

TABLE 1

ON/OFF states for first and second set of switches of the first switching circuit SC1.

|  | TA | | TB | |
| --- | --- | --- | --- | --- |
|  | TA minus ΔTAE1 (T0 – T3) | ΔTAE1 (T3 – T4) Tsc1off1 | TB minus ΔTBE1 (T4 – T7) | ΔTBE1 (T7 – T8) Tsc1off2 |
| First set of SC1 | ON | OFF | OFF | OFF |
| Second set of SC1 | OFF | OFF | ON | OFF |

Table 2 below shows the states for the first and second set of switches for the second switching circuit SC2 for the switching period TP. The start time and end time of each interval are also given.

TABLE 2

ON/OFF states for first and second set of switches of the second switching circuit SC2.

|  | TA (T0-T4) | | | TB (T4-T8) | | |
|---|---|---|---|---|---|---|
|  | ΔTAS1 (T0-T1) TA minus (ΔTAS1 and Tsc2off2 | ΔTAE2) (T1-T2) | ΔTAE2 (T2-T4) | ΔTBS1 (T4-T5) Tsc2off1 | TB minus TBS1 and ΔTBE2 | (T5-T6) ΔTBE2 (T6-T8) Tsc2off2 |
| First set of SC2 | OFF | ON | OFF | OFF | OFF | OFF |
| Second set of SC2 | OFF | OFF | OFF | OFF | ON | OFF |

The time interval Tsc1off1 and the time interval Tsc2off1 are at least partially overlapping, i.e. the time interval Tsc1off1 starts before the time interval Tsc2off1 ends or the time interval Tsc2off1 starts before the time interval Tsc1off1 ends. Moreover, the time interval Tsc1off2 and the time interval Tsc2off2 are at least partially overlapping, i.e. the time interval Tsc1off2 starts before the time interval Tsc2off2 ends or the time interval Tsc2off2 starts before the time interval Tsc1off2 ends. In this way the switches of the first switching circuit SC1 and switches of the second switching circuit SC2 are synchronized.

In the present embodiment, the length of time interval Tsc2off1 is equal to the length of time interval Tsc2off2, and the length of time interval Tsc1off1 is equal to the length of time interval Tsc1off2.

In the embodiment above, the time intervals Tsc2off1 and Tsc2off2 are longer than the time intervals Tsc1off1 and Tsc1off2. However, they could have the same duration, or the time interval Tsc1off could be longer than the period Tsc2off. This depends on the required time for achieving Zero Voltage Switching (ZVS) in the switching circuits and may also depend on the voltage between the first positive and negative DC terminals and the voltage between the second positive and negative DC terminals.

In the embodiment above, the centre of time interval Tsc1off1 is controlled to be close to or equal to the centre of time interval Tsc2off1 and the centre of time interval Tsc1off2 is controlled to be close to or equal to the centre of time interval Tsc2off2.

Zero Voltage Switching is maintained for all switches at turn ON at high to full load as is illustrated in 8.

Figure 9:
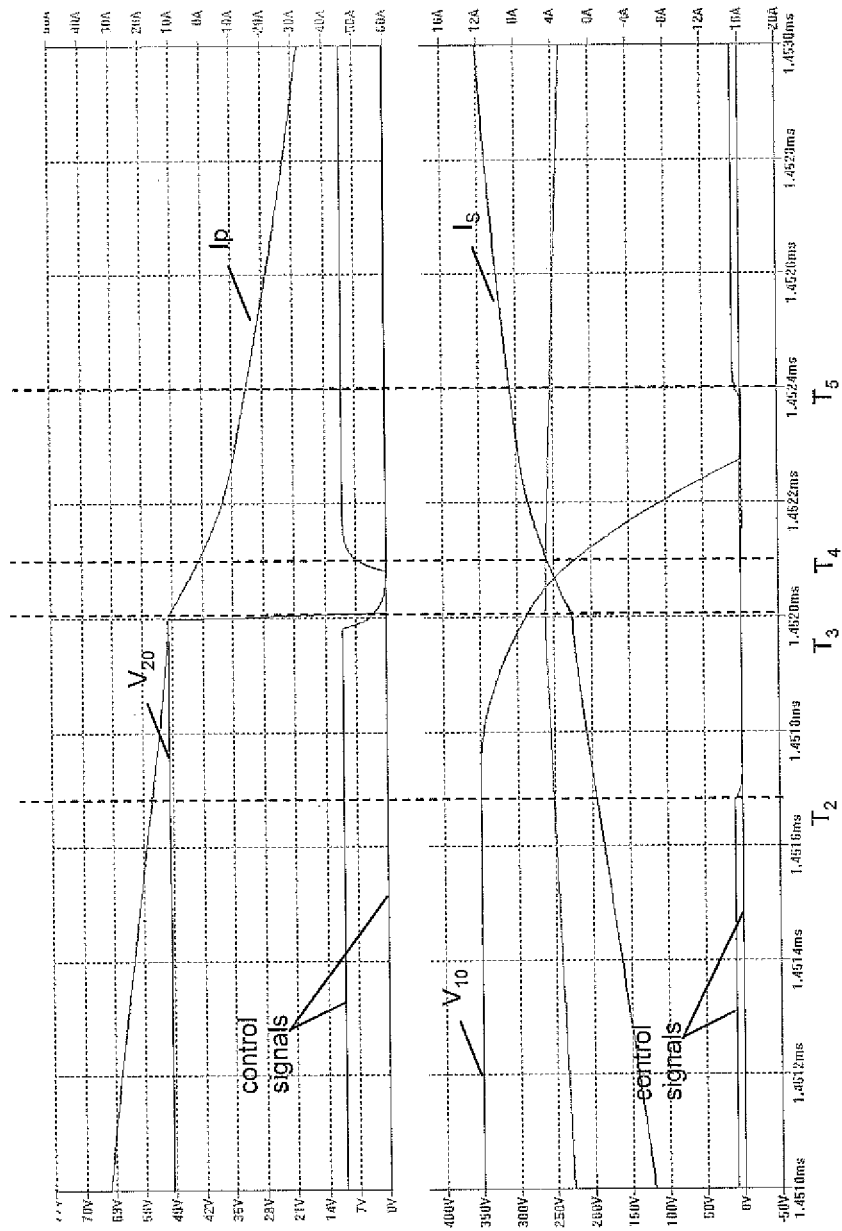
FIG. 9 shows details of FIG. 9.

In FIG. 9, voltage V10 at node 10 and voltage V20 at node 20 are both high before time instance T2, thus switches S1sc1, S4sc1 (first set of SC1) and S1sc2 (first set of SC1) are all conducting and the switches S2sc1, S3sc1 (second set of SC1) and S2sc2 (second set of SC2) are all non-conducting.

The first set S1sc2 of switches in the second switching circuit SC2 is turned off at time instance T2. At the time instance when current Is becomes positive it is capable of bringing the voltage at node 10 from high to low by discharging the output capacitances in both the first and second set of switches of the second switching circuit. The second set of switches S2sc2 of the second switching circuit is commanded to be ON at T5, and are thus turned on with a voltage close to zero without any significant switching losses, so called Zero Voltage Switching (ZVS).

Since $I_p$ is positive, turning off first set of switches S1sc1 and S4sc1 at T3 results in a rapid change of voltage at node 20 from high to low and voltage at node 22 from low to high, caused by the discharging/charging of the output capacitances in the first and second sets of switches S1sc1, S3sc1 and S2sc1, S4sc1 of the first switching circuit. The second set of switches S2sc1 and S3sc1 of the first switching circuit SC1 are commanded to be ON at T4, and are thus turned on with a voltage close to zero without any significant switching losses, so called ZVS.

Note that in the present embodiment, the time interval T2 to T5, between turning off S1sc2 and turning on S2sc2 is longer then the time interval T3 to T4 for turning off S1sc1, S4sc1 and turning on S2sc1, S3sc1 since it will take longer time for the voltage Vout of 350 V of the second switching circuit SC2 to commutate than for the voltage Vin of 50 V of the first switching circuit SC1.

Figure 10:
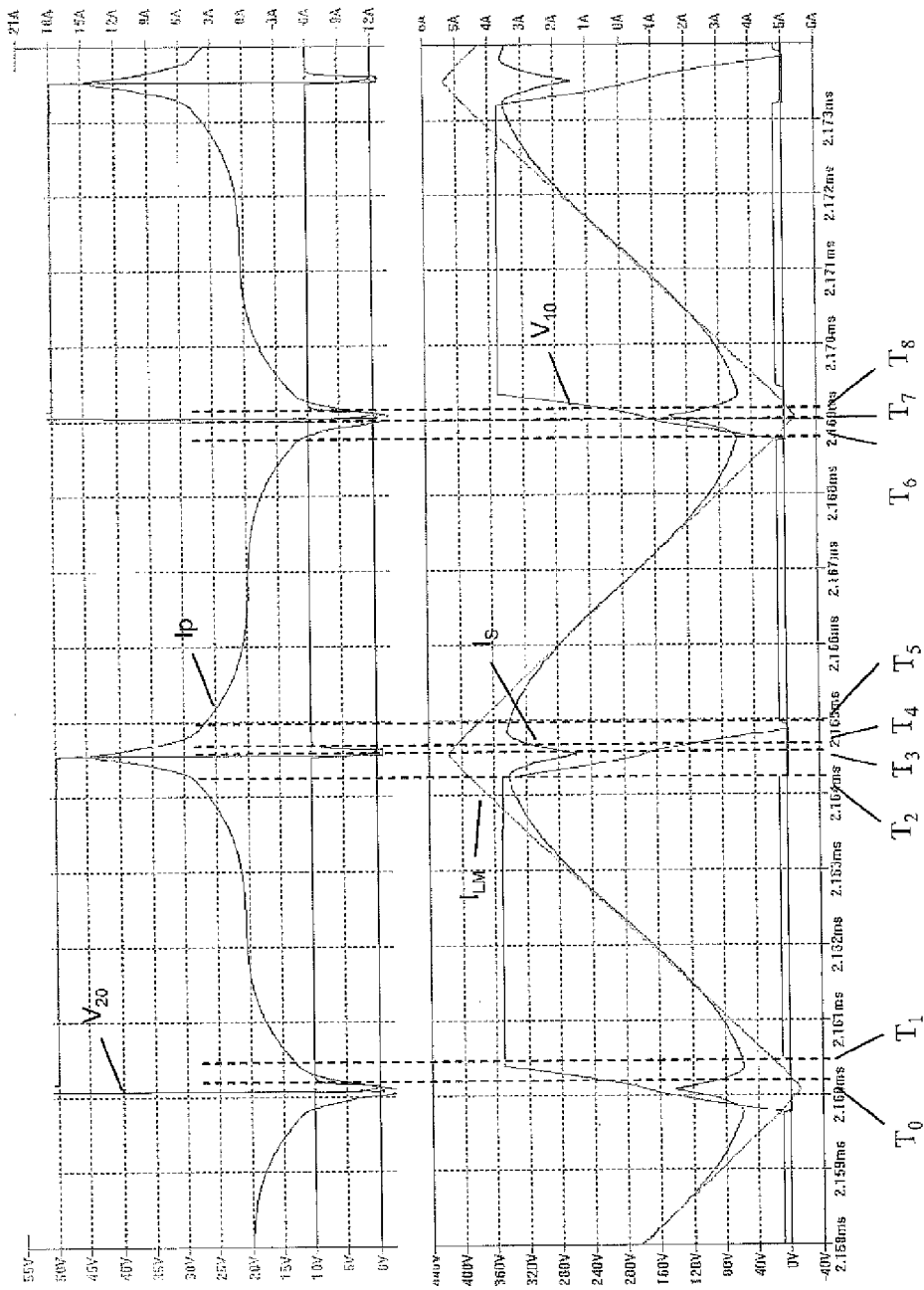
FIG. 10 shows waveforms of voltages and currents of the second embodiment at no load.
Figure 11:
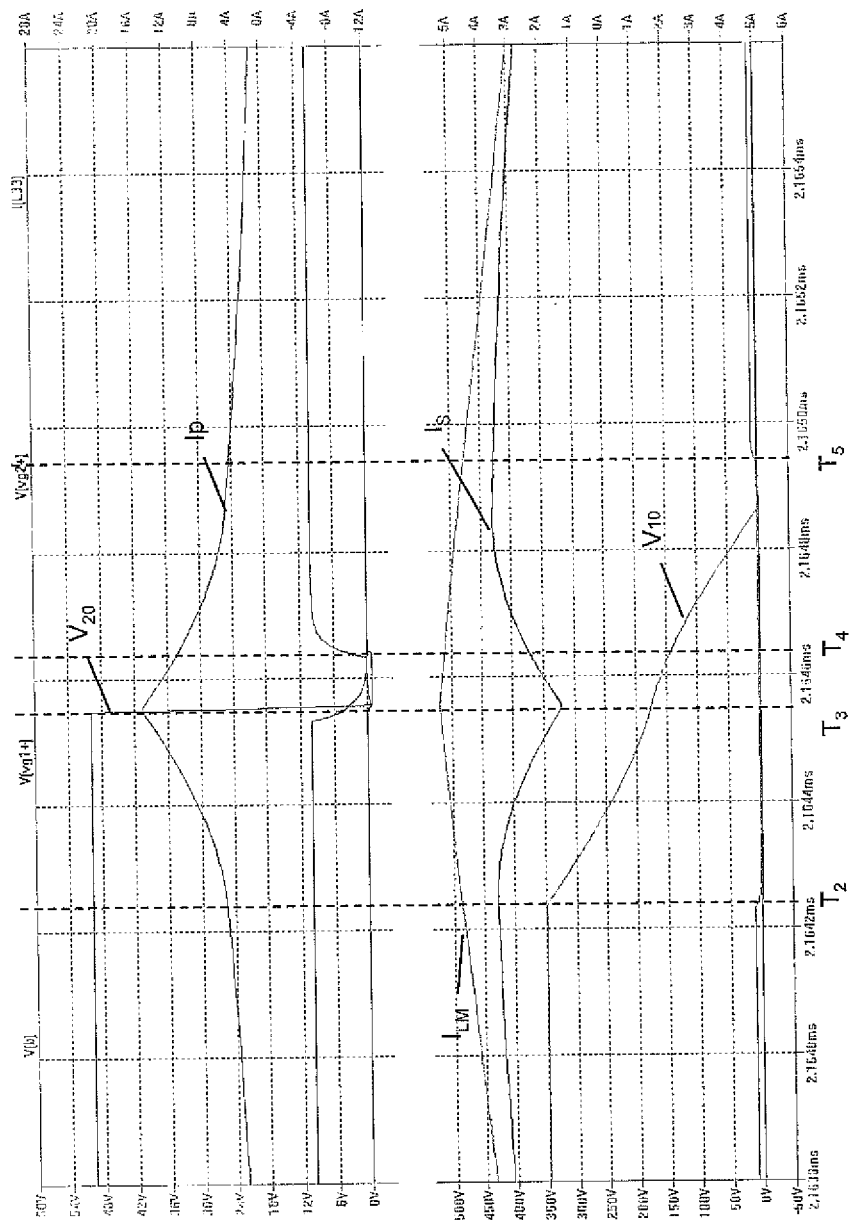
FIG. 11 shows details of FIG. 10.

ZVS is also maintained for all switches at turn on even at low to no load which is illustrated in FIG. 10. We are now referring to FIG. 11.

Voltage V10 at node 10 and the voltage V20 at node 20 are both high before time instance T2, thus switches S1sc1, S4sc1, and S1sc2 are all conducting.

The switch S1sc2 is turned off at time instance T2. The current Is is positive and is therefore capable of bringing V10 from high to low by discharging the output capacitances in the switches S1sc2 and S2sc2.

The current Is is decaying due to the changed voltage over resonant inductor, $L_{RC}$, during the time period T2 to T3. However the magnetizing current $I_{LM}$ in winding $L_S$, is still increasing and is therefore reflected to primary winding, $L_P$, and causes the current $I_P$ to increase. Since $I_P$ is increasing and positive, turning off switches S1sc1 and S4sc1 results in a rapid change of voltage V20 at node 20 from high to low and voltage V22 at node 22 from low to high, caused by the discharging/charging of the output capacitances in the switches S1sc1, S3sc1 and S2sc1, S4sc1.

Figure 12:
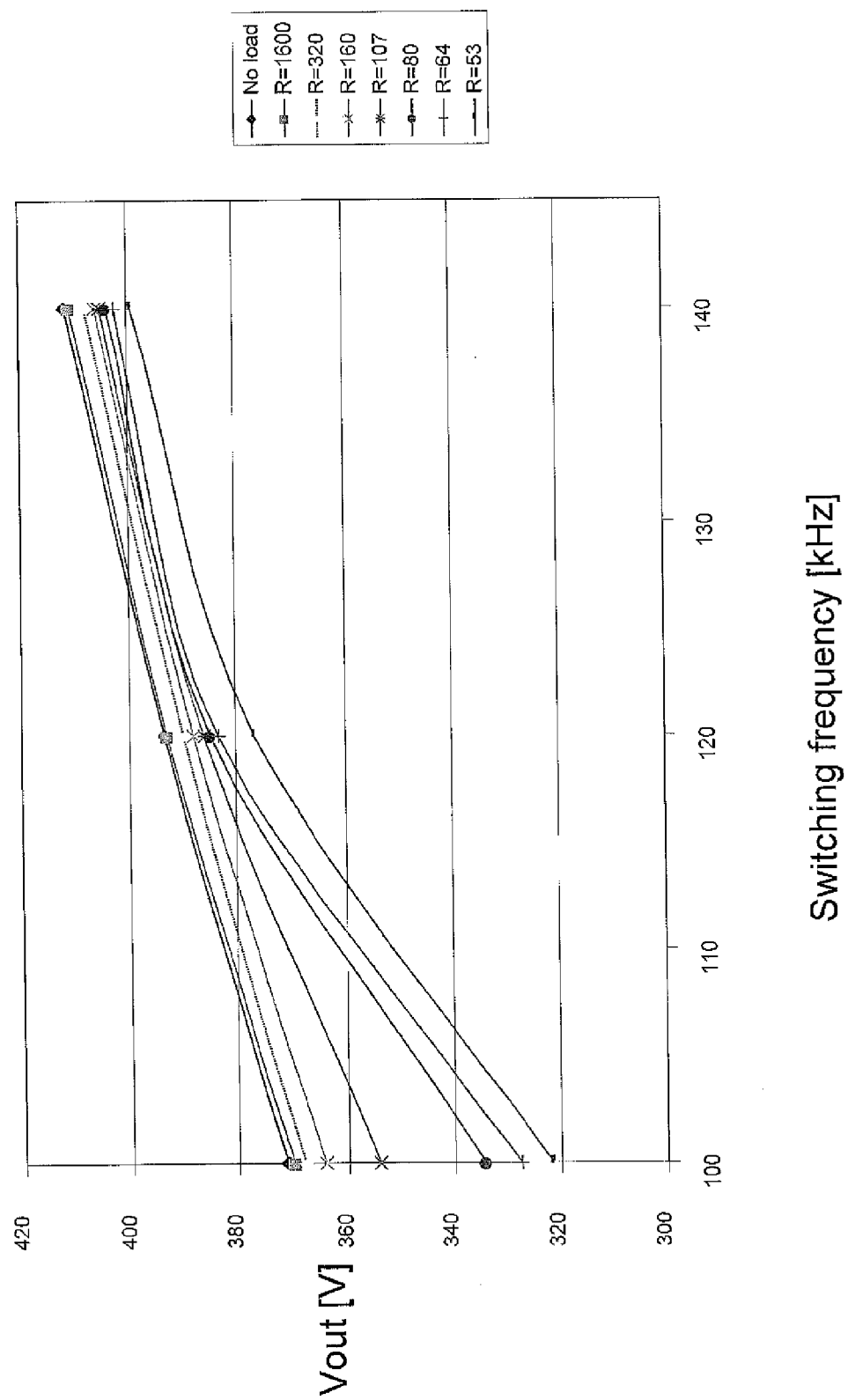
FIG. 12 shows the variation of output voltage Vout for different switching frequencies and different loads.
Figure 13:
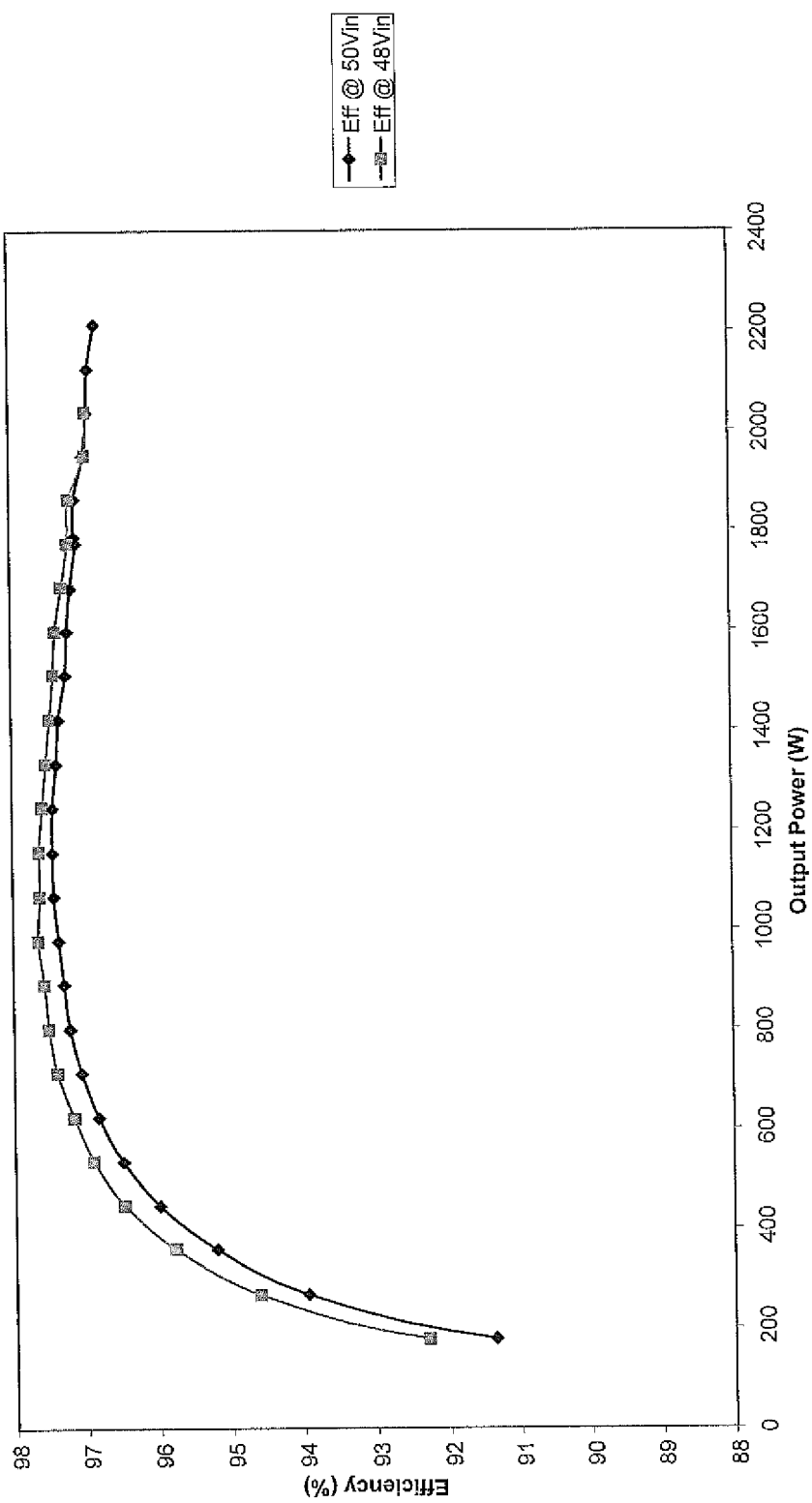
FIG. 13 shows the efficiency curve as a function of the output power for the embodiment in FIG. 3.

The output voltage Vout may be controlled by changing the switching frequency. This is illustrated in FIG. 12, where it is shown that the output voltage Vout may be varied for different loads and different switching frequencies. The ZVS operation of all switches is controlled by proper delays, i.e. the time intervals Tsc1off1, Tsc1off2, Tsc2off1 and Tsc2off2, between switching instances as described in the text and in FIG. 8 and table 2 and table 3.

The relation between the voltage between first DC terminals T1P, T1N of the series resonant DC/DC converter and the voltage between second DC terminals T2P, T2N of the series resonant DC/DC converter can be controlled by varying the length of the switching period TP.

The direction of the power flow through the series resonant DC/DC converter can be controlled by varying length of the switching period TP. Hence, the series resonant DC/DC converter can be controlled to be a bidirectional series resonant DC/DC converter.

The switches of the first and second switching circuit SC1, SC2 are controlled to provide zero voltage switching ZVS at switch turn on and to provide nearly zero current switching ZCS at switch turn off by controlling the first and second switching circuit to have a fixed switching frequency close to the series resonant frequency.

The switches of the first and second switching circuit SC1, SC2 can be controlled by switching at an operating point at or near the series resonant frequency for all voltages over the first DC terminals which are inside a specified operating range.

The switches of the first and second switching circuit SC1, SC2 can be controlled by switching at an operating point at or near the series resonant frequency for all load conditions at the second DC terminals.

UPS System with Series Resonant DC/DC Converter

In the introduction above, the typical uses of a series resonant DC/DC converter was described. In a typical UPS system there will be one common control system for all the components of the UPS system, including the series resonant DC/DC converter. The common control circuit can for example comprise a status flag signal as an indicator for the direction of the power flow through the bidirectional DC/DC converter.

Moreover, the control circuit comprises sensors for sensing the current and/or the voltage at the first DC terminals T1P, T1N and the second DC terminals T2P, T2N.

In a first mode of operation the status flag signal indicates that the power should flow from the first DC terminals T1P, T1N to the second DC terminals T2P, T2N. Here, the control circuit is controlling the current and/or voltage of the second DC terminals T2P, T2N based on a predetermined reference signal for the first mode of operation.

In a second mode of operation the status flag signal indicates that the power should flow from the second DC terminals T2P, T2N to the first DC terminals T1P, T1N. Here, the control circuit is controlling the current and/or voltage of the first DC terminals T1P, T1N based on a predetermined reference signal for the second mode of operation.

As mentioned above, the series resonant DC/DC converter may be used as a DC/DC converter for an UPS system, as shown in FIG. 1, where its first DC terminals T1P, T1N are connected to the battery and its second DC terminals T2P, T2N connected to a DC bus (not shown).

The status flag signal may be switched to the first mode of operation when a failure in the AC mains is detected. In such a situation power should be transferred from the battery connected to the first DC terminals to the DC bus connected to the second DC terminals. Here, the control circuit is controlling the voltage and/or current at the second DC terminals T2P, T2N at a predetermined level suitable as input to the DC/AC converter as long as the battery power supply allows it.

The status flag signal may be switched to the second mode of operation when the AC mains is working again, then supplying power from the DC bus to the battery for recharging the battery. Here, the control circuit is controlling the voltage and/or current at the first DC terminals T1P, T1N at a predetermined level suitable as input to the battery.

The status flag signal may have a third mode of operation for indicating that no power should be transferred through the bidirectional DC/DC converter. In this mode of operation, all switches should be switched off. In this mode of operation there is no failure in the AC mains, and the battery is fully charged.

Another application for the series resonant DC/DC converter is for re-use of energy stored in battery storages.

Results

The efficiency of the series resonant DC/DC converter according to FIG. 3 of has been tested. FIG. 12 shows the results of the testing. In the testing, two efficiency curves are illustrated, the first curve shows the efficiency as a function of output power for a circuit having an input voltage Vin of 50V and the second curve shows the efficiency as a function of output power for a circuit having an input voltage Vin of 48V. The output voltage Vout was controlled to be 355V.

As seen, the efficiency is above 96% in the power output range from ca 400 W to 2200 W. The maximum power efficiency is above 97.5%. This is a considerable improvement over the prior art DC/DC converters mentioned in the introduction, which showed efficiencies of ca 92%.

The invention claimed is:

1. Method for controlling a series resonant DC/DC converter, comprising the steps of:

defining a switching period TP from a start time Tstart to an end time Tend for the series resonant DC/DC converter; where the switching period TP comprises a first half period TA from the start time Tstart to a center time Tcenter and a second half period TB from the center time Tcenter to the end time Tend, and defining a subsequent switching period TP+1 after the switching period TP;

controlling a first set (S1$sc$1; S1$sc$1, S4$sc$1) of switches of a first switching circuit (SC1) to be ON from a beginning start time Tstart of the first half period TA minus a time interval ΔTAE1, where the time interval ΔTAE1 is provided at the end of the first half period TA;

controlling a second set (S2$sc$1; S2$sc$1, S3$sc$1) of switches of the first switching circuit (SC1) to be ON from a beginning center time Tcenter of the second half period TB minus a time interval ΔTBE1, where the time interval ΔTBE1 is provided at the end of the second half period TB;

controlling the first set (S1$sc$1; S1$sc$1, S4$sc$1) and the second set (S2$sc$1; S2$sc$1, S3$sc$1) of switches of the first switching circuit (SC1) to be OFF in the time interval ΔTAE1 and the time interval ΔTBE1;

controlling a first set (S1$sc$2; S1$sc$2, S4$sc$2) of switches of a second switching circuit (SC2) to be ON in the first half period TA minus a time interval ΔTAS1 and minus a time interval ΔTAE2, where the time interval ΔTAS1 is provided at the beginning of the first half period TA and where the time interval ΔTAE2 is provided at the end of the first half period TA;

controlling a second set (S2$sc$2; S2$sc$2, S3$sc$2) of switches of the second switching circuit (SC2) to be ON in the second half period TB minus a time interval ΔTBS1 and minus a time interval ΔTBE2, where the time interval ΔTBS1 is provided at the beginning of the second half period TB and where the time interval ΔTBE2 is provided in the end of the second half period TB;

controlling the first set (S1$sc$2; S1$sc$2, S4$sc$2) and the second set (S2$sc$2; S2$sc$2, S3$sc$2) of switches of the second switching circuit (SC2) to be OFF in the time intervals ΔTAS1, ΔTAE2, ΔTBS1 and ΔTBE2;

where the time interval ΔTAE1 forms a first time interval Tsc1off1 wherein the first and second sets of switches of the first switching circuit (SC1) are OFF, and where the time interval ΔTBE1 forms a second time interval Tsc1off2 wherein the first and second sets of switches of the first switching circuit (SC1) are OFF;

where the time intervals ΔTAE2 and ΔTBS1 form a continuous time interval Tsc2off1, where the first and second set of switches of the second switching circuit (SC2) are OFF; and where the time interval ΔTBE2 and a time interval ΔTAS1(TP+1) of the subsequent switching period TP+1 form a continuous time interval Tsc2off2, where the first and second sets of switches of the second switching circuit (SC2) are OFF;

where the time interval Tsc1off1 and the time interval Tsc2off1 is overlapping and where the time interval Tsc1off2 and the time interval Tsc2off2 is overlapping.

2. Method according to claim 1, where the method comprises the step of controlling the centre of the interval Tsc1off1 to be close to or equal to the centre of the time interval Tsc2off1 and the centre of the interval Tsc1off2 to be close to or equal to the centre of the time interval Tsc2off2.

3. Method according to claim 1 or 2, where the method comprises the step of controlling a relation between a voltage between first DC terminals (T1P, T1N) of the series resonant DC/DC converter and a voltage between second DC terminals (T2P, T2N) of the series resonant DC/DC converter by varying the length of the switching period TP.

4. Method according to claim 1, where the method comprises the step of controlling the direction of the power flow through the series resonant DC/DC converter by varying the switching period TP.

5. Method according to claim 1, where the method comprises the step of controlling the switches of the first and second switching circuit (SC1, SC2) to provide zero voltage switching (ZVS) at switch turn on and to provide nearly zero current switching (ZCS) at switch turn off by controlling the first and second switching circuit to have a fixed switching frequency close to the series resonant frequency.

6. Method according to claim 5, where the switches of the first and second switching circuit (SC1, SC2) are controlled by switching at an operating point at or near the series resonant frequency for all voltages over the first DC terminals which are inside a specified operating range.

7. Method according to claim 5, where the switches of the first and second switching circuit (SC1, SC2) are controlled by switching at an operating point at or near the series resonant frequency for all load conditions at the second DC terminals.

8. Series resonant DC/DC converter comprising:
first DC terminals (T1P, T1N);
second DC terminals (T2P, T2N);
an inductor device (ID; TD);
a first switching circuit (SC1) connected between the first DC terminals (T1P, T1N) and the inductor device (ID; TD), where the first switching circuit (SC1) comprises a first set (S1sc1; S1sc1, S4sc1) of switches and a second set (S2sc1; S2sc1, S3sc1) of switches;
a second switching circuit (SC2) and a resonant circuit (RC) connected between the second DC terminals (T2P, T2N) and the inductor device (ID; TD), where the second switching circuit (SC2) comprises a first set (S1sc2; S1sc2, S4sc2) of switches and a second set (S2sc2; S2sc2, S3sc2) of switches;
a control circuit for controlling the set of switches of the first and second switching circuits (SC1, SC2) according to the method of claim 1.

* * * * *